(12) United States Patent
Bruce (10) Patent No.: US 7,822,884 B2
(45) Date of Patent: Oct. 26, 2010

(54) DISTRIBUTED DIRECT MEMORY ACCESS PROVISION WITHIN A DATA PROCESSING SYSTEM

(75) Inventor: Alistair Crone Bruce, Stockport (GB)

(73) Assignee: ARM Limited, Cambridge (GB)

( * ) Notice: Subject to any disclaimer, the term of this patent is extended or adjusted under 35 U.S.C. 154(b) by 608 days.

(21) Appl. No.: 11/637,249

(22) Filed: Dec. 12, 2006

(65) Prior Publication Data

US 2007/0162650 A1 Jul. 12, 2007

(30) Foreign Application Priority Data

Dec. 13, 2005 (GB) ................... 0525340.6

(51) Int. Cl.
*G06F 13/28* (2006.01)
(52) U.S. Cl. ............... 710/22; 710/38; 710/305
(58) Field of Classification Search ..................... 710/22
See application file for complete search history.

(56) References Cited

U.S. PATENT DOCUMENTS

| | | | |
|---|---|---|---|
| 4,847,750 | A | 7/1989 | Daniel |
| 5,748,945 | A | 5/1998 | Ng |
| 5,828,856 | A | 10/1998 | Bowes et al. |
| 5,878,217 | A * | 3/1999 | Cherukuri ............. 709/212 |
| 6,453,365 | B1 | 9/2002 | Habot |
| 6,665,748 | B1 | 12/2003 | Slater et al. |
| 6,678,755 | B1 | 1/2004 | Peterson et al. |
| 6,745,264 | B1 | 6/2004 | Luke et al. |
| 6,754,732 | B1 | 6/2004 | Dixon et al. |
| 6,959,350 | B1 | 10/2005 | Luke et al. |
| 2002/0038401 | A1 | 3/2002 | Zaidi et al. |
| 2003/0033454 | A1 * | 2/2003 | Walker et al. ............ 710/22 |

(Continued)

FOREIGN PATENT DOCUMENTS

EP 0 442 615 8/1991

(Continued)

OTHER PUBLICATIONS

UK Search Report for GB0525340.6, date of search Apr. 6, 2006.

*Primary Examiner*—Henry W Tsai
*Assistant Examiner*—Elias Mamo
(74) *Attorney, Agent, or Firm*—Nixon & Vanderhye P.C.

(57) ABSTRACT

An adaptor circuit 20 for peripheral devices 14, 18 is provided with a direct memory access manager 38. This local direct memory access manager 38 is able to autonomously manage data transfers on behalf of its associated peripheral device 14, 18. A computer program tools used to generate signal interconnects 24 is used to additionally specify whether a DMA capability is to be provided for a peripheral device 14, 18, whereupon an adaptor circuit 20, 22 including a DMA manager 38 can be included within the signal interconnect. A DMA command signal is added to the interconnect signals being passed around the signal interconnect 24 and enables DMA command/configuration data to be distributed using the existing signal distribution infrastructure and addressed to the associated peripheral device 14, 18 of the target local DMA controller 38. Existing software drivers can issue control information to a main central DMA controller 6, which then passes this information on to a DMA Capable adaptor circuit 20 to manage the transfer concerned. Thus the present technique can be used without requiring software drivers to be rewritten.

23 Claims, 5 Drawing Sheets

U.S. PATENT DOCUMENTS

| | | |
|---|---|---|
| 2003/0182477 A1* | 9/2003 | Fukawa et al. ............... 710/22 |
| 2004/0044809 A1* | 3/2004 | Takashima et al. ........... 710/22 |
| 2004/0243738 A1 | 12/2004 | Day et al. |
| 2005/0038936 A1 | 2/2005 | Barry et al. |

FOREIGN PATENT DOCUMENTS

| | | |
|---|---|---|
| EP | 0 905 629 | 3/1999 |
| EP | 1 059 589 | 12/2000 |
| GB | 2 394 330 | 4/2004 |
| JP | 2-44472 | 2/1990 |
| JP | 2001-76027 | 3/2001 |
| WO | 96/08773 | 3/1996 |
| WO | 2006/006084 | 1/2006 |
| WO | 2006/040692 | 4/2006 |

* cited by examiner

DISTRIBUTED DIRECT MEMORY ACCESS PROVISION WITHIN A DATA PROCESSING SYSTEM

BACKGROUND OF THE INVENTION

1. Field of the Invention

This invention relates to data processing systems. More particularly, this invention relates to the provision of distributed direct memory access management capabilities within a data processing system.

2. Description of the Prior Art

It is known to provide data processing systems with a direct memory access controller which is able to autonomously manage data transfers. As an example, in a system-on-chip design including a CPU and a DMA controller, the DMA controller may perform regular high volume data transfers, such as screen refresh, whilst the CPU is left to control other data transfers. This reduces the processing burden upon the CPU.

It is also known to provide more than one DMA controller within a system. These may, for example, be provided on respective buses to provide separate DMA capabilities on those buses.

A problem associated with traditional DMA controllers is that they introduce a signal transfer bottleneck since they service the DMA requirements of several devices which must all be routed through the DMA controller. Where more than one DMA controller is provided, there is the additional complication of distributing control information between those DMA controllers such that they act in a coordinated fashion. A further disadvantage with the traditional approach is that the DMA controllers will tend to have a fixed priority level associated with the data transfers that they instruct and will utilise a single memory map. This provides a disadvantageously coarse level of control.

SUMMARY OF THE INVENTION

Viewed from one aspect the present invention provides an adaptor circuit comprising:

a peripheral port operable to connect to at least one peripheral device;

a system port operable to connect to a plurality of further devices;

a direct memory access manager operable to autonomously manage data transfers between one of said at least one peripheral devices coupled to said peripheral port and at least one of said plurality of further devices coupled to said system port; and a bypass circuit coupled to said system port, said peripheral port and said direct memory access manager and operable in:

(i) a bypass mode to connect said system port to said peripheral port such that data transfers managed from outside said adaptor circuit pass between said system port and said peripheral port; and (ii) in a direct memory access mode to connect said system port to said direct memory access manager and to connect said peripheral port to said direct memory access manager such that said direct memory access manager autonomously manages data transfers between one of said at least one peripheral devices coupled to said peripheral port and at least one of said plurality of further devices coupled to said system port.

The present technique recognises that overall advantages can be achieved by providing a DMA capability dedicated to one or more peripheral devices and disposed in an adaptor in the path between those peripheral devices and one or more further devices. The DMA capabilities provided can be tailored to the peripheral devices to which they relate and since more DMA functionality can be provided a bottleneck in data transfer capability is less likely to arise. It is particularly preferred, although not essential, that an adaptor circuit provides a DMA capability for a single peripheral device connected thereto in a way that the DMA capability can be directly targeted at that individual peripheral device.

The present technique moves against the technical prejudice in the field which would normally hold that replicating DMA functionality at multiple points within a system would be wasteful of resources. However, the present technique recognises that the resources consumed are less than might be considered since the DMA managers provided for the peripherals can be relatively simple since they only need to deal with one or few peripheral devices and the overall benefits to system performance by removing potential bottlenecks are considerable. Furthermore, the signal routing difficulties associated with provision of centralised DMA units are reduced since the adaptors can be physically close to the peripheral devices with which they are associated. The technique also allows software compatibility with existing DMA architectures in which a main system DMA manager accepts DMA control information in the known way but, instead of performing the DMA function itself, forwards the control information to the appropriate DMA adaptor using DMA command signals. In this way advantages of the new system may be realised without needing to rewrite software drivers.

Whilst the system port could have a variety of different forms, the technique is particularly well suited to systems in which the system port on the adaptor circuit provides a system slave port for receiving data transfers and a system master port for issuing data transfers. It will be appreciated that a peripheral device normally only receives data transfers and accordingly a system port for such a device would normally only be provided with a system slave port. However, the addition of the direct memory access manager to the adaptor has the result that the adaptor can now initiate data transfers and accordingly a system master port is also added to issue such data transfers.

The peripheral port on the adaptor for coupling to the one or more peripheral devices is a peripheral master port since the data transfers are normally issued to peripheral devices rather than originating within peripheral devices. Thus, there would not normally be a requirement for a peripheral master port on the adaptor circuit.

As previously mentioned, an adaptor circuit could provide a peripheral port, or ports, interfacing with multiple peripheral devices downstream. The peripheral port could connect with a further level of interconnect structure for routing data transfers to selected ones of a plurality of downstream peripheral devices. However, the present technique is particularly well suited to embodiments in which the adaptor circuit is connected to a single peripheral device such that the direct memory access manager can be tailored to support direct memory access data transfers to and from that particular single peripheral device.

The impact of the adaptor circuit on system operation is advantageously reduced when the adaptor circuit is transparent to data transfers managed from outside the adaptor circuit when operating in the bypass mode.

The direct memory access manager advantageously has a priority level associated with the data transfers it manages and also may be provided with its own memory map for that direct memory access manager.

The direct memory access manager provided within the adaptor circuit will typically require some level of dynamic configuration during operation. One preferred way of achieving this is to add one or more direct memory access manager command signals to the signals passed to the adaptor circuit. These direct memory access manager command signals can then be used to trigger one or more associated data transfers to be used to configure the direct memory access manager concerned. The direct memory access manager configuration data can effectively be routed by addressing it to the associated peripheral device, or devices, and asserting the direct memory access manager command signals to indicate that it is DMA configuration data rather than data truly destined for the one or more peripheral devices to which it is being sent.

As an alternative mechanism, which may be desirable in other circumstances, the direct memory access manager within an adaptor circuit may have an associated portion of the memory address space dedicated to storing its configuration data and will read its configuration data from such memory space.

The configuration data can specify a variety of parameters associated with a direct memory access manager, but will typically include parameters specifying details of one or more data transfer operations to be performed autonomously by that direct memory access manager.

It will be appreciated that the system port could be connected to the plurality of further devices using various techniques. Preferred techniques include an interconnect matrix, such as, for example, the AXI bus system, as well as more traditional system buses.

Viewed from another aspect the present invention provides an adaptor circuit comprising:

a peripheral port means for connecting to at least one peripheral device means;

a system port means for connecting to a plurality of further devices means;

a direct memory access manager means for autonomously managing data transfers between one of said at least one peripheral device means coupled to said peripheral port means and at least one of said plurality of further device means coupled to said system port means; and a bypass circuit means coupled to said system port means, said peripheral port means and said direct memory access manager means for in:

(i) a bypass mode, connecting said system port means to said peripheral port means such that data transfers managed from outside said adaptor circuit pass between said system port means and said peripheral port means; and (ii) in a direct memory access mode, connecting said system port means to said direct memory access manager means and connecting said peripheral port means to said direct memory access manager means such that said direct memory access manager means autonomously manages data transfers between one of said at least one peripheral device means coupled to said peripheral port means and at least one of said plurality of further device means coupled to said system port means.

Viewed from a further aspect the present invention provides an integrated circuit comprising:

at least one peripheral device;

a plurality of further devices; and at least one adaptor circuit having:

a peripheral port operable to connect to said at least one peripheral device;

a system port operable to connect to said plurality of further devices;

a direct memory access manager operable to autonomously manage data transfers between one of said at least one peripheral devices coupled to said peripheral port and at least one of said plurality of further devices coupled to said system port; and a bypass circuit coupled to said system port, said peripheral port and said direct memory access manager and operable in:

(i) a bypass mode to connect said system port to said peripheral port such that data transfers managed from outside said adaptor circuit pass between said system port and said peripheral port; and (ii) in a direct memory access mode to connect said system port to said direct memory access manager and to connect said peripheral port to said direct memory access manager such that said direct memory access manager autonomously manages data transfers between one of said at least one peripheral devices coupled to said peripheral port and at least one of said plurality of further devices coupled to said system port.

In the context of an integrated circuit including at least one of the adaptor circuits which provides its own direct memory access manager, it is preferred to additionally provide a traditional shared direct memory access controller which is able to autonomously manager data transfers on behalf of devices which do not have an adaptor including a dedicated direct memory access manager.

Viewed from a further aspect the present invention provides a method of managing data transfers, said method comprising the steps of:

connecting at least one peripheral device to a peripheral port of an adaptor circuit;

connecting a plurality of further devices to a system port of said adaptor circuit;

providing within said adaptor circuit a direct memory access manager operable to autonomously manage data transfers between one of said at least one peripheral devices coupled to said peripheral port and at least one of said plurality of further devices coupled to said system port;

providing a bypass circuit coupled to said system port, said peripheral port and said direct memory access manager; and (i) in a bypass mode, connecting said system port to said peripheral port and managing data transfers from outside said adaptor circuit such that data transfers pass between said system port and said peripheral port; and (ii) in a direct memory access mode, connecting said system port to said direct memory access manager, connecting said peripheral port to said direct memory access manager, and autonomously managing with said direct memory access manager data transfers between one of said at least one peripheral devices coupled to said peripheral port and at least one of said plurality of further devices coupled to said system port.

Viewed from a further aspect the present invention provides a computer program product carrying a computer program for controlling a computer to generate a configuration for an interconnect between at least one peripheral device and a plurality of further devices; said computer program comprising:

code responsive to a user input specifying that said at least one peripheral device is to be provided with direct memory access management capability to configure said interconnect to include an adaptor circuit dedicated to said at least one peripheral device and including a direct memory access manager operable to autonomously manage data transfers.

It is known to provide a variety of computer program tools for use in developing interconnections within modern systems which will typically include several peripheral devices and several further devices and that will have a complex set of requirements and interdependencies. The present technique of providing DMA support local to a peripheral device integrates particularly well with such tools since the DMA capability for a peripheral device may be specified to the computer program which will generate the configuration for the interconnect as a whole and this computer program tool can act upon such a user specification by interposing an adaptor having the above discussed DMA capability into the interconnect path between the peripheral and the one or more further devices.

The interconnect design tool can also conveniently be used to specify one or more parameters characterising the direct memory access management capability to be added. The system designer at the time they are specifying peripherals to be provided with ports to an interconnect will typically know the DMA requirements of those peripherals in the context of the system as a whole and thus will be able to readily specify these parameters to configure the adaptor being provided, for example the parameters may specify a buffer size to be provided, the priority level to be associated with a particular local direct memory access controller and/or the memory map for that direct memory access controller.

The use of computer tools to generate the interconnects is particularly useful when the interconnect is in the form of an interconnect matrix, such as an AXI interconnection matrix.

Viewed from a further aspect the present invention provides a signal interconnect for connecting at least one peripheral device, a plurality of further devices and at least one direct memory access manager, said signal interconnect including:

an address bus for transferring address signals specifying a target address for a data transfer;

one or more direct memory access manager command signals for triggering use of one or more associated data transfers to pass configuration data to configure a selected one of said at least one direct memory access managers as selected in dependence upon an associated target address on said address bus.

The provision of one or more direct memory access manager command signals within the signal interconnect allows for the distribution of direct memory access control configuration information through a system in a more uniform way utilising the existing interconnect structure which already connects to the DMA controllers concerned. This reduces the overhead associated with DMA control distribution.

This use of direct memory access manager command signals is particularly well suited to interconnection matrix systems where at least one direct memory access manager is provided within an adapter circuit local to a peripheral and the target address for a peripheral may be used to direct the direct memory access manager commands to that peripheral. The type of commands which may be passed include, for example, a number of data words to be included within a data transfer, a target address associated with a data transfer and a destination address associated with a data transfer (other different parameters may be passed in addition to or instead of these).

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
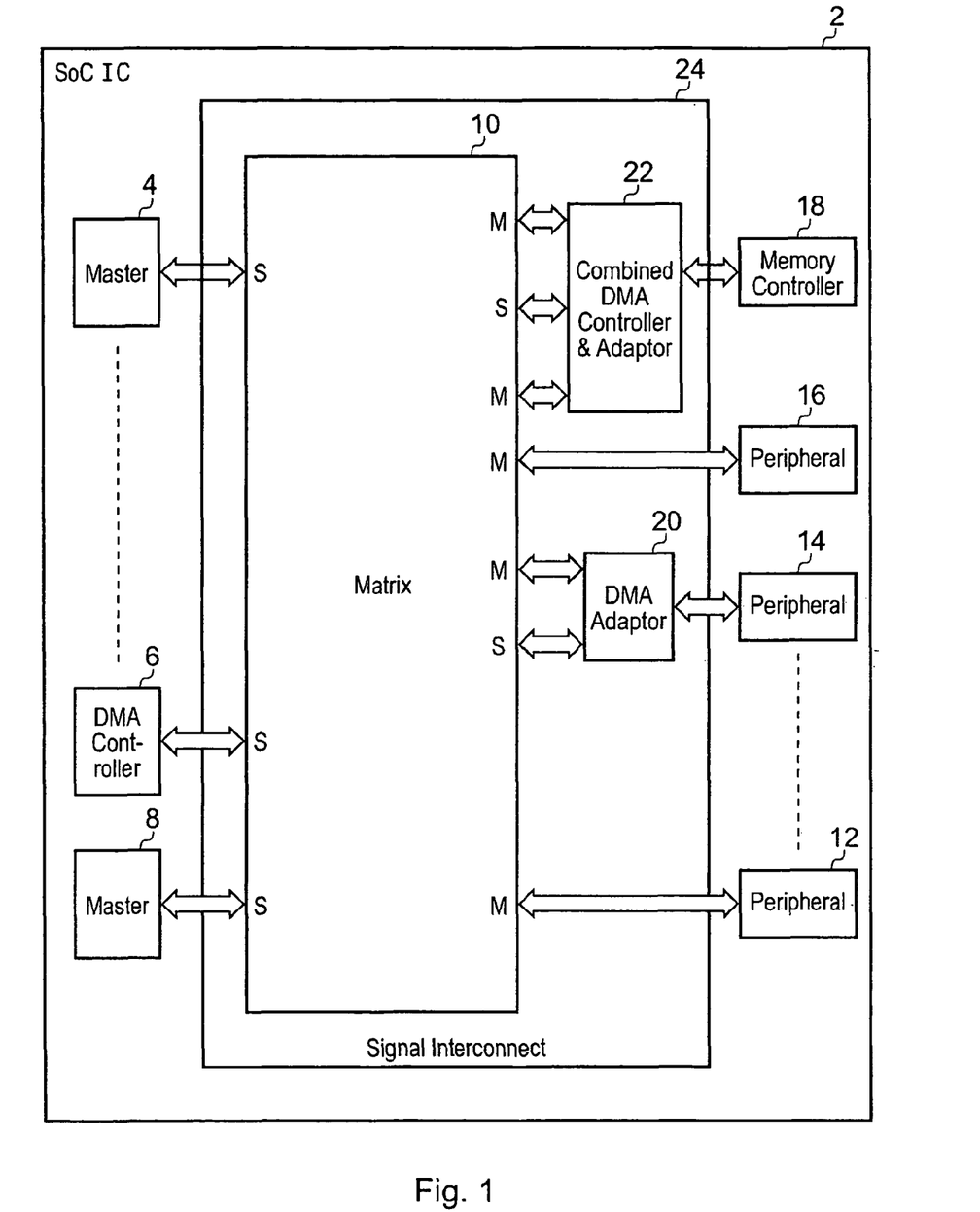
FIG. 1 schematically illustrates an integrated circuit including peripheral devices connected to an interconnect matrix via adaptor circuits which provide a DMA capability.

FIG. 1 schematically illustrates a system-on-chip integrated circuit 2 comprising a plurality of devices 4, 6, 8 connected as masters to an interconnect matrix 10. A plurality of peripheral devices 12, 14, 16, 18 are connected as slaves to the interconnect matrix 10. Some of the peripheral devices 12, 16 are directly connected to the interconnect matrix 10. The peripheral device 14 is connected via an adaptor circuit 20 to the interconnect matrix 10. The adaptor circuit 20 provides a direct memory access capability as will be discussed later. The peripheral device 18, which is a memory controller, is also connected via an adaptor 22 which provides a DMA capability and the ability to control/configure other DMA managers (such as that within the adaptor 20) via side channels as desired.

The matrix 10 and the adaptors 20, 22 form part of an overall signal interconnect 24 which is generated by a computer program tool. The adaptor circuits 20, 22 can be provided as additional forms of adaptor circuits to other adaptor circuits which are already supported by such tools, such as, for example, adaptors which change the bus width to support legacy peripherals and the like. Adding a DMA capability associated with one or more peripheral devices by specifying a new class of adaptor circuit to be included within the signal interconnect 24 provides a particularly efficient way to allow a system designer to utilise the present techniques and provide distributed DMA capabilities within their integrated circuit 2.

It will be seen that as well as the DMA capabilities provided by the adaptor circuits 20, 22, a traditional shared DMA controller 6 is also provided and used to autonomously manage data transfers between other peripheral devices 12, 16, further devices 4, 8 and even data transfers involving the peripheral devices 14, 18 which have a local DMA manager, but where that local DMA manager is not capable of supporting the particular DMA transfer concerned.

Figure 2:
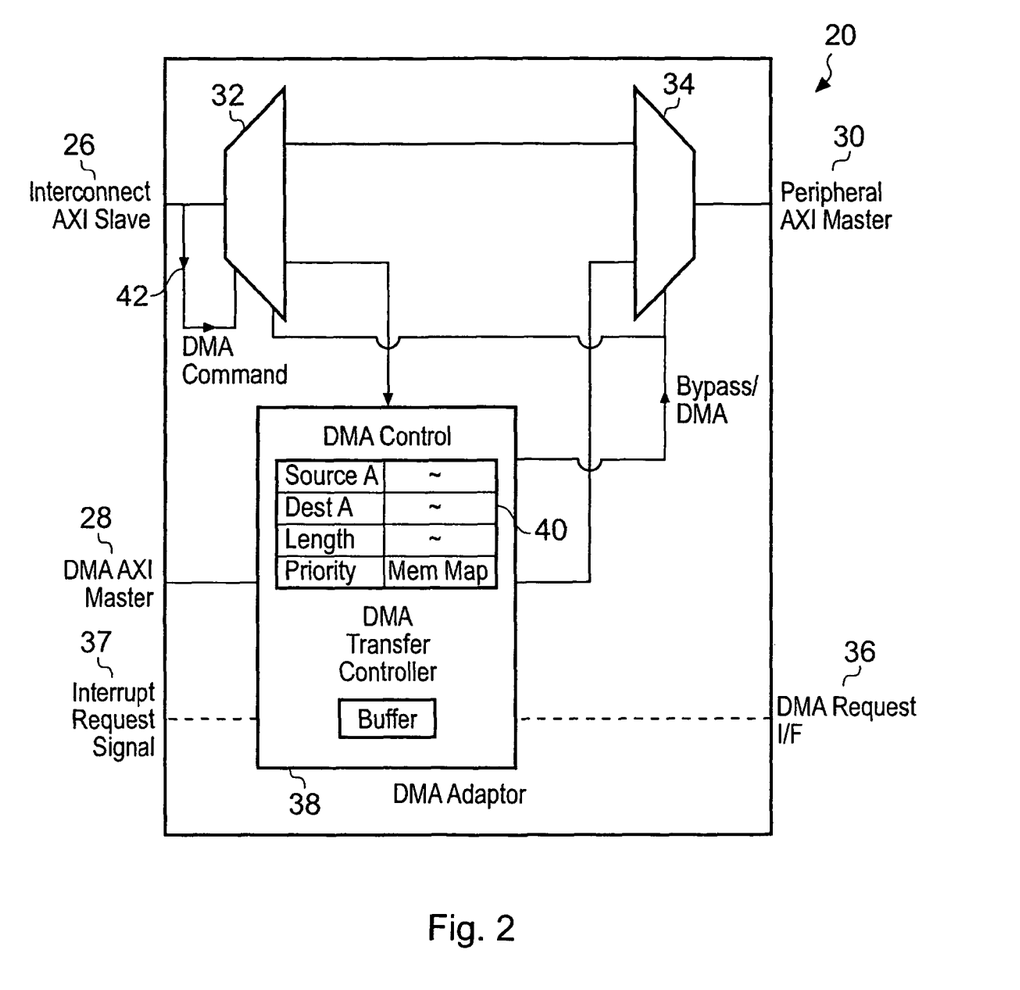
FIG. 2 schematically illustrates an adaptor circuit including a DMA controller.

FIG. 2 schematically illustrates an adaptor circuit 20 provided with a DMA capability. The adaptor circuit 20 has a system slave port 26, a system master port 28 and a peripheral master port 30. When operating in the bypass mode multiplexers 32, 34 directly connect the system slave port 26 to the peripheral master port 30 such that the adaptor circuit 20 is transparent to data transfers being performed (which are managed outside of the adaptor circuit 20, e.g. by a CPU or by DMA controller 6). When a DMA request 36 is received by a direct memory access manager 38 provided within the adaptor circuit 20, this places the adapter circuit 20 into a direct memory access mode. In this mode, the direct memory access manager 38 autonomously manages data transfers between the peripheral master port 30, the system master port 28 and the system slave port 26 as appropriate. When the data transfers have been completed, this is signalled by raising the Interrupt Request Signal 37 The direct memory access manager 38 can be configured to repeat this sequence without requiring further control information.

As an alternative, the software could poll the direct memory access manager 38 to detect when a transfer is needed and when such a transfer has completed.

The system master port 28 which is added to the adaptor circuit 20, and would not normally be provided to support a peripheral device (which normally only acts as a slave), allows the adaptor circuit 20 to initiate data transfers as required by the direct memory access manager 38. The direct memory access manager 38 includes configuration data 40 stored therein specifying parameters such as a source address and a destination address of a data transfer to be performed, a length of a data transfer to be performed, a priority level to be associated with a data transfer to be performed and a memory map for the data transfer to be performed. It will be appreciated that some of these parameters may not be required to be locally stored within the direct memory access manager 38, and/or additional parameters may be required or desired in other embodiments.

The system slave port 26 receives an interconnect signal (bus signal) which includes a direct memory access command signal 42. This signal 42 is used to control the multiplexer 32 to direct data addressed to one of the peripherals associated with the peripheral master port 30 to instead be fed to the direct memory access controller 38 to configure the direct memory access controller 38, such as the data 40.

Figure 3:
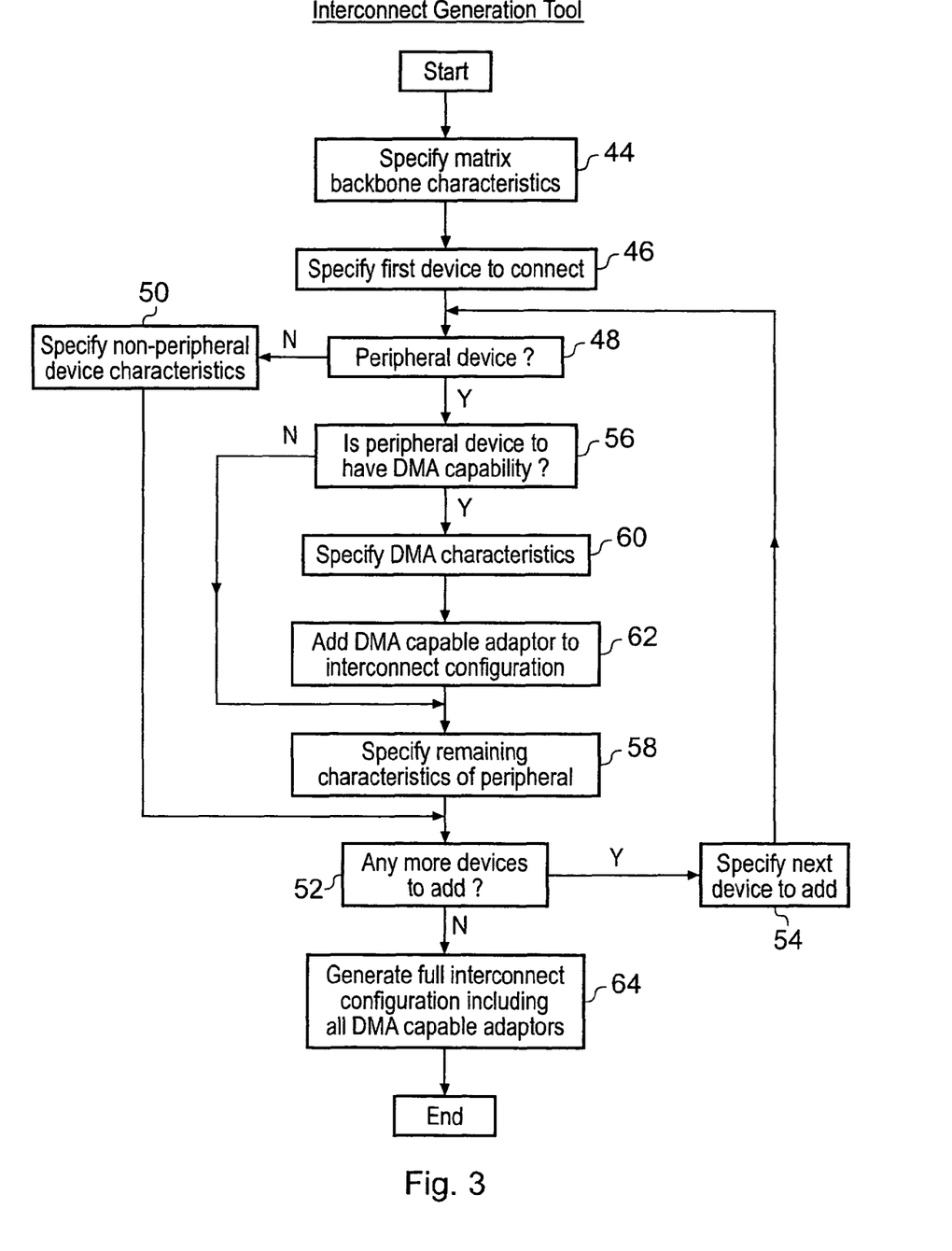
FIG. 3 is a flow diagram schematically illustrating the portion of the operation of an interconnect generation tool related to specifying DMA capability for adaptor circuits used with peripheral devices.

FIG. 3 is a flow diagram schematically illustrating the additional functionality added to a tool for generating an interconnect configuration. As will be appreciated by those skilled in this technical field, such tools are typically provided as computer programs running on general purpose computers. A user will specify parameters of the interconnect structure as a whole and then specify the various devices, masters, slaves, peripherals, etc to be connected to that interconnect structure. The computer tools generate an appropriate interconnect matrix supporting the specified devices and taking into account device requirements, timings and the like. An example of such a tool is provided by ARM Limited, Cambridge, England. In other embodiments the provision of DMA capable adaptors need not be restricted to peripheral devices, e.g. such DMA capable adaptors may be used between a main interconnect block and a secondary interconnect block connected to several peripherals. FIG. 3 is only one example of a process employing the present techniques.

FIG. 3 schematically illustrates an example modification to such a standard tool. At step 44, the user specifies the characteristics of the interconnect matrix as a whole. At step 46 the user specifies the first device to be connected. Step 48 determines whether that device is a peripheral device. If the device is not a peripheral device, then at step 50 the user specifies the characteristics of the non-peripheral devices that are requested by the tool in order that the non-peripheral device can be appropriately connected to the interconnect matrix. Step 52 then determines whether there are any more devices to add, and if there are such additional devices, then these are specified at step 54 and processing is returned to step 48.

If the determination at step 48 was that the device is a peripheral device, then step 56 requests a user input as to whether or not that peripheral device is to be provided with a DMA capability. If a DMA capability is not to be added to that device, then processing proceeds to step 58 where the remaining characteristics of that peripheral device are specified before processing passes to step 52. If the user response at step 56 was that the peripheral device is to be provided with a local DMA capability, then the user specifies at step 60 the characteristics of that DMA capability. Typical parameters a user would specify at this time would be a data buffer size, a priority level to be associated with data transfers from that peripheral performed by the direct memory access controller provided locally and a memory map to be associated with the local DMA capability. Once the user has been prompted for these characteristics, then step 62 adds the specified adaptor circuit 20 to the signal interconnect 24 being configured. The adding of other types of adaptor circuits to such a signal interconnect 34 is already provided, e.g. for reasons such as accommodating differing bus widths.

Once the determination at step 52 is that there are no more devices to add, then the software tool progresses to step 64 at which the full interconnect configuration is generated including the specified DMA capable adaptors 20, 22. This interconnect configuration will typically be in the form of a data file which can be integrated with other data to provide a computer file which will ultimately control the manufacture of an integrated circuit incorporating such a signal interconnect 24 and the specified adaptor circuits 20, 22.

Figure 4:
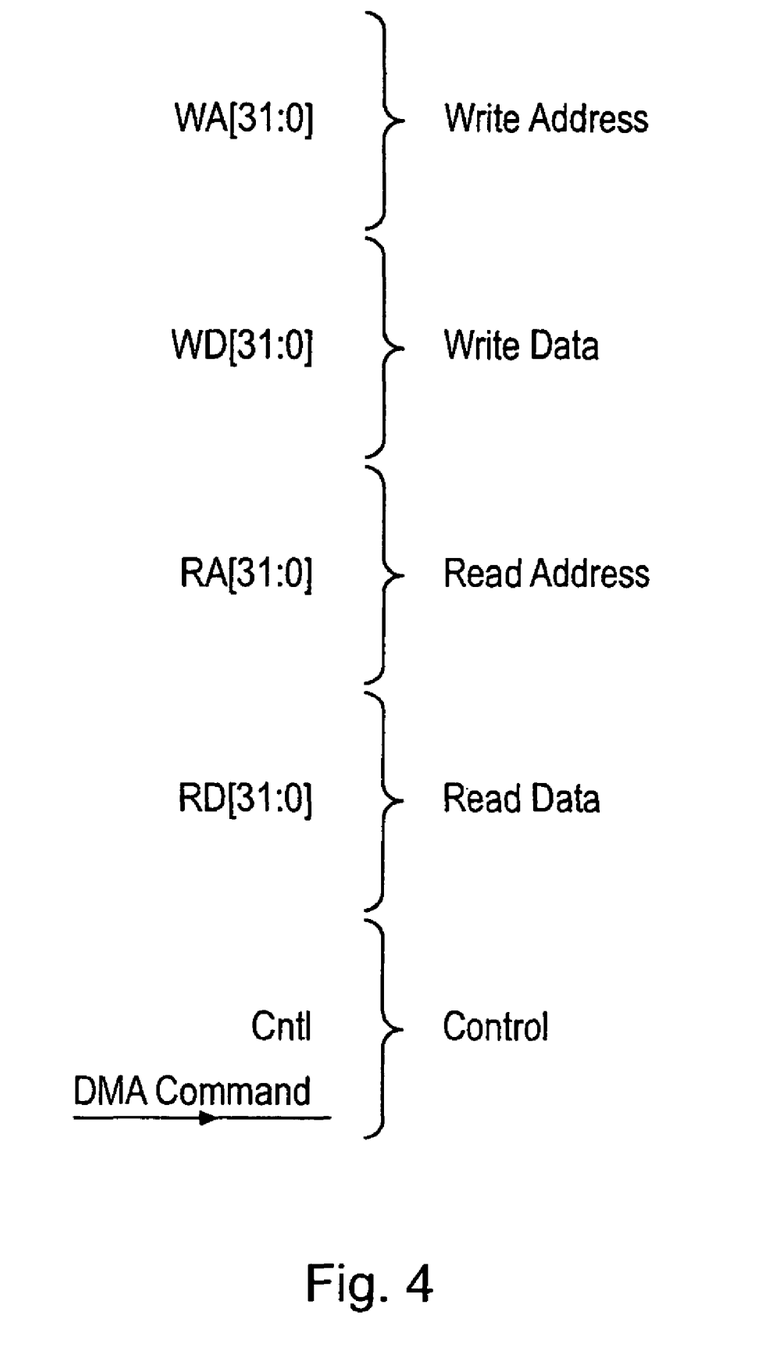
FIG. 4 schematically illustrates an interconnect bus including a plurality of channels and provided with a DMA command signal for indicating that a DMA command is being passed.

FIG. 4 schematically illustrates an interconnect signal incorporating a write address channel, a write data channel, a read data channel and a control channel. The control channel is augmented by a direct memory access (DMA) command signal. When this DMA command signal is asserted, the data being written within the write data channel is associated with a direct memory access manager 38 which is to be configured. The write address is used to route the configuration data to the required destination. The write address will, in this example, be the peripheral device address. Thus, the DMA command signal allows DMA command/configuration data to piggy back on top of the normal signal distribution infrastructure and make its way to the direct memory access manager 38 to be configured.

Figure 5:
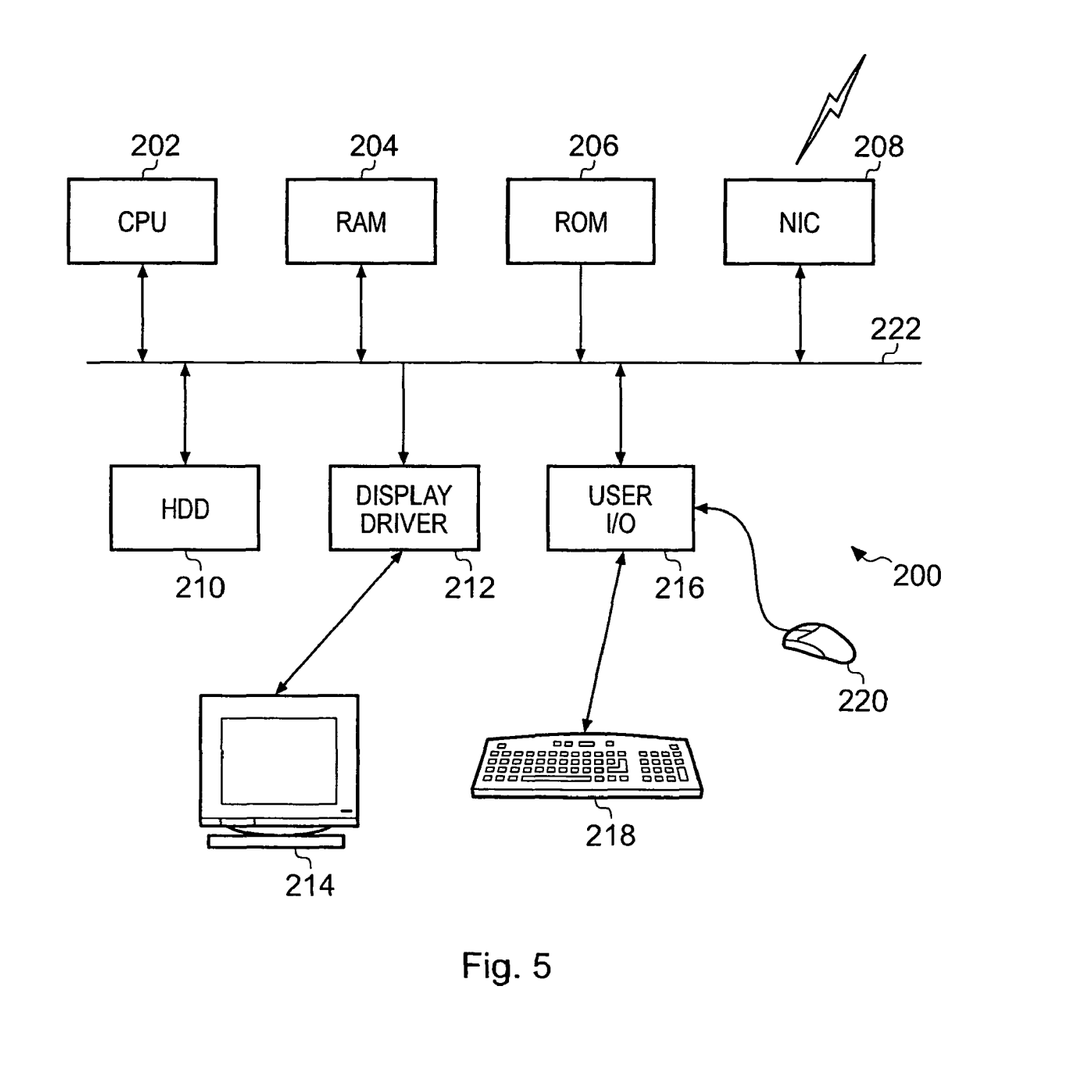
FIG. 5 illustrates a general purpose computer of a form which may be used to implement some of the present techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims

I claim:

1. An adaptor circuit comprising:
   a peripheral port configured to connect to at least one peripheral device;
   a system port configured to connect to a plurality of further devices;
   a direct memory access manager configured to autonomously manage data transfers between one of said at least one peripheral devices coupled to said peripheral port and at least one of said plurality of further devices coupled to said system port; and
   a bypass circuit, coupled to said system port, said peripheral port and said direct memory access manager, configured to operate in:
   (i) a bypass mode to connect said system port to said peripheral port such that data transfers managed from outside said adaptor circuit pass between said system port and said peripheral port; and
   (ii) in a direct memory access mode to connect said system port to said direct memory access manager and to connect said peripheral port to said direct memory access manager such that said direct memory access manager autonomously manages data transfers between one of said at least one peripheral devices coupled to said peripheral port and at least one of said plurality of further devices coupled to said system port.

2. An adaptor circuit as claimed in claim 1, wherein said system port comprises a system slave port for receiving data transfers and a system master port for issuing data transfers.

3. An adaptor circuit as claimed in claim 2, wherein data transfers for data transfers managed from outside said adaptor circuit are received at said system slave port and data transfers for data transfers managed by said data transfer manager are issued from said system master port.

4. An adaptor circuit as claimed in claim 1, wherein said peripheral port comprises a peripheral master port for issuing data transfers.

5. An adaptor circuit as claimed in claim 1, wherein said peripheral port is coupled to a single peripheral device.

6. An adaptor circuit as claimed in claim 1, wherein in said bypass mode said adaptor circuit is transparent to said data transfers managed from outside said adaptor circuit.

7. An adaptor circuit as claimed in claim 1, wherein said direct memory access manager has a priority level associated with data transfers managed by said direct memory access manager for arbitrating said data transfers relative to data transfers initiated by one or more of said further devices.

8. An adaptor circuit as claimed in claim 1, wherein said direct memory access manager has an individual memory map associated therewith.

9. An adaptor circuit as claimed in claim 1, wherein said adaptor circuit is responsive to one or more direct memory access manager command signals within a data transfer received at said system port to trigger use of one or more associated data transfers pass configuration data to configure said direct memory access manager.

10. An adaptor circuit as claimed in claim 9, wherein said data transfer is addressed to one of said one or more peripheral devices.

11. An adaptor circuit as claimed in claim 1, wherein said direct memory access manager has an associated portion of memory address space to which configuration data to configure said direct memory access manager is written.

12. An adaptor circuit as claimed in claim 9, wherein said configuration data specifies parameters of a data transfer operation managed by said direct memory access manager.

13. An adaptor circuit as claimed in claim 1, wherein said system port is connected to an interconnect matrix.

14. An adaptor circuit as claimed in claim 1, wherein said system port is connected to a system bus.

15. An adaptor circuit comprising:
   a peripheral port means for connecting to at least one peripheral device means;
   a system port means for connecting to a plurality of further devices means;
   a direct memory access manager means for autonomously managing data transfers between one of said at least one peripheral device means coupled to said peripheral port means and at least one of said plurality of further device means coupled to said system port means; and
   a bypass circuit means, coupled to said system port means, said peripheral port means and said direct memory access manager means, for:
   (i) in a bypass mode, connecting said system port means to said peripheral port means such that data transfers managed from outside said adaptor circuit pass between said system port means and said peripheral port means; and
   (ii) in a direct memory access mode, connecting said system port means to said direct memory access manager means and connecting said peripheral port means to said direct memory access manager means such that said direct memory access manager means autonomously manages data transfers between one of said at least one peripheral device means coupled to said peripheral port means and at least one of said plurality of further device means coupled to said system port means.

16. An integrated circuit comprising:
   at least one peripheral device;
   a plurality of further devices; and
   at least one adaptor circuit having:
   a peripheral port configured to connect to said at least one peripheral device;
   a system port configured to connect to said plurality of further devices;
   a direct memory access manager configured to autonomously manage data transfers between one of said at least one peripheral devices coupled to said peripheral port and at least one of said plurality of further devices coupled to said system port; and
   a bypass circuit, coupled to said system port, said peripheral port and said direct memory access manager, configured, in:
   (i) a bypass mode, to connect said system port to said peripheral port such that data transfers managed from outside said adaptor circuit pass between said system port and said peripheral port; and
   (ii) in a direct memory access mode, to connect said system port to said direct memory access manager and to connect said peripheral port to said direct memory access manager such that said direct memory access manager autonomously manages data transfers between one of said at least one peripheral devices coupled to said peripheral port and at least one of said plurality of further devices coupled to said system port.

17. An integrated circuit as claimed in claim 16, comprises at least one direct memory access controller coupled to at least some of said plurality of further devices and configured to autonomously manage data transfers from a selected one of said plurality of further devices to a selected other of said plurality of further devices.

18. A method of managing data transfers, said method comprising the steps of:
   connecting at least one peripheral device to a peripheral port of an adaptor circuit;
   connecting a plurality of further devices to a system port of said adaptor circuit;
   providing within said adaptor circuit a direct memory access manager configured to autonomously manage data transfers between one of said at least one peripheral devices coupled to said peripheral port and at least one of said plurality of further devices coupled to said system port;
   providing a bypass circuit, coupled to said system port, said peripheral port and said direct memory access manager, and configured:
   (i) in a bypass mode, to connect said system port to said peripheral port and managing data transfers from outside said adaptor circuit such that data transfers pass between said system port and said peripheral port; and
   (ii) in a direct memory access mode, to connect said system port to said direct memory access manager, connect said peripheral port to said direct memory access manager, and autonomously manage with said direct memory access manager data transfers between one of said at least one peripheral devices coupled to said peripheral port and at least one of said plurality of further devices coupled to said system port.

19. A computer program product comprising a computer readable non-transitory storage medium including a computer program for controlling a computer to generate a configuration for an interconnect between at least one peripheral device and a plurality of further devices; said computer program comprising:
   code responsive to a user input specifying that said at least one peripheral device is to be provided with direct memory access management capability to configure said interconnect to include an adaptor circuit dedicated to said at least one peripheral device and including a direct memory access manager operable to autonomously manage data transfers; and
   code responsive to at least one parameter characterizing said direct memory access management capability to configure said direct memory access manager added to said interconnect to provide said direct memory access management capability, wherein said interconnect is an interconnection matrix.

20. A computer program product as claimed in claim 19, wherein said at least one parameter includes one or more of:
   a data buffer size for said adaptor circuit;
   a priority level to be associated with a data transfer to be managed by said direct memory access manager; and
   a memory map for said adaptor circuit.

21. A signal interconnect for connecting at least one peripheral device, a plurality of further devices and at least one direct memory access manager, said signal interconnect including:
   an address bus for transferring address signals specifying a target address for a data transfer; and
   one or more direct memory access manager command signals for triggering use of one or more associated data transfers to pass configuration data to configure a selected one of said at least one direct memory access managers as selected in dependence upon an associated target address on said address bus,
   wherein said signal interconnect is a signal interconnect matrix; and said selected one of said at least one direct memory access managers is within an adaptor circuit disposed between said signal interconnect and one or more peripheral devices.

22. A signal interconnect as claimed in claim 21, wherein said associated target address is an address of said one or more peripheral devices.

23. A signal interconnect as claimed in claim 21, wherein said configuration data includes one of more of:
   a number of data words to be included within a data transfer to be managed by said direct memory access manager;
   a target address associated with a data transfer to be managed by said direct memory access manager; and
   a destination address associated with a data transfer to be managed by said direct memory access manager.

* * * * *